(12) United States Patent
Lee et al.

(10) Patent No.: US 9,208,511 B2
(45) Date of Patent: Dec. 8, 2015

(54) SYSTEM AND METHOD FOR LOCATION-BASED RECOMMENDATIONS

(75) Inventors: Johnny Hsienchow Lee, San Gabriel, CA (US); Chun To Tse, San Francisco, CA (US)

(73) Assignee: Simple Rules, Inc., Sunnyvale, CA (US)

( * ) Notice: Subject to any disclaimer, the term of this patent is extended or adjusted under 35 U.S.C. 154(b) by 273 days.

(21) Appl. No.: 13/592,158

(22) Filed: Aug. 22, 2012

(65) Prior Publication Data

US 2013/0054698 A1 Feb. 28, 2013

Related U.S. Application Data (60) Provisional application No. 61/526,237, filed on Aug. 22, 2011, provisional application No. 61/643,750, filed on May 7, 2012.

(51) Int. Cl.
G06F 15/16 (2006.01)
G06Q 30/02 (2012.01)

(52) U.S. Cl.
CPC ........ *G06Q 30/0259* (2013.01); *G06Q 30/0261* (2013.01); *G06Q 30/0267* (2013.01); *G06Q 30/0282* (2013.01)

(58) Field of Classification Search
CPC .. H04L 67/18; G06F 17/30241; G06Q 50/01; G06Q 30/0261; G06Q 30/0631
USPC ........................... 709/204, 206, 217, 218, 219
See application file for complete search history.

(56) References Cited

U.S. PATENT DOCUMENTS

| | | | |
|---|---|---|---|
| 5,493,692 | A | 2/1996 | Theimer et al. |
| 6,049,711 | A | 4/2000 | Ben-Yehezkel et al. |
| 6,618,593 | B1 | 9/2003 | Drutman et al. |
| 7,412,202 | B2 | 8/2008 | Gutta et al. |
| 7,917,154 | B2 | 3/2011 | Fortescue et al. |
| 8,069,422 | B2 | 11/2011 | Sheshagiri et al. |
| 8,091,032 | B2 | 1/2012 | Fischer |
| 8,095,153 | B2 | 1/2012 | Jenkins et al. |
| 8,116,777 | B2 | 2/2012 | Klein |
| 2008/0214148 | A1* | 9/2008 | Ramer et al. ............... 455/414.1 |
| 2012/0123867 | A1* | 5/2012 | Hannan ...................... 705/14.58 |
| 2012/0166433 | A1* | 6/2012 | Tseng ............................ 707/728 |
| 2012/0259790 | A1* | 10/2012 | Hu et al. ........................ 705/319 |
| 2013/0095857 | A1* | 4/2013 | Garcia et al. ............... 455/456.3 |
| 2013/0159110 | A1* | 6/2013 | Rajaram et al. ............ 705/14.66 |
| 2013/0260795 | A1* | 10/2013 | Papakipos et al. ......... 455/456.3 |

* cited by examiner

*Primary Examiner* — Jonathan Bui (74) *Attorney, Agent, or Firm* — Jeffrey Schox; Diana Lin (57) ABSTRACT

A method for providing a recommendation to a user, including retrieving, connection content associated with social network connections of the user; calculating, for each of the social network connections, an influence score for each of a plurality of locations; receiving a request location from a user device associated with the user; extracting a recommendation from relevant connection content, the relevant connection content being content associated with the request location and generated by at least one of the social network connections having the highest influence scores for the request location, the recommendation comprising a venue referenced within the relevant connection content; and sending the recommendation to the user device.

23 Claims, 2 Drawing Sheets

SYSTEM AND METHOD FOR LOCATION-BASED RECOMMENDATIONS

CROSS-REFERENCE TO RELATED APPLICATIONS

This application claims the benefit of U.S. Provisional Application No. 61/526,237 filed 22 Aug. 2011 and U.S. Provisional Application No. 61/643,750 filed 7 May 2012, which are both incorporated in their entirety by this reference.

TECHNICAL FIELD

This invention relates generally to the social networking field, and more specifically to a new and useful system and method for providing recommendations in the social networking field.

BACKGROUND

With the rise of social network platforms, users have built social networks of connections personalized to each user. These connections, along with the content they generate, are indicative of the each user's preferences. Furthermore, there has been a trend toward location-based discovery, such as discovery of new venues, products, and/or services. While some location-based discovery platforms exist, they do not personalize or tailor the provided recommendations to the user's preferences. Thus, there is a need in the personalized recommendation field to create a new and useful system and method of location-based recommendations.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. System.

Figure 1:
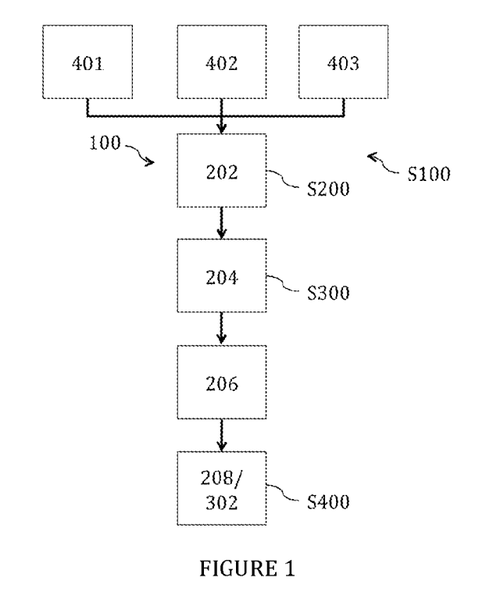
FIG. 1 is a schematic representation of a system for providing a recommendation.

As shown in FIG. 1, the system 100 includes a server 200 that communicates with one or more user devices 300 and/or one or more application programming interfaces (APIs). The system can further accommodate users 120, wherein the users can interact with the server through the APIs via the user devices in performing one or more tasks or functions. The server 200 is preferably a computer or a network of computers, but can alternatively be one or more user devices in a distributed system. The device 300 can be a computer, a mobile phone, a tablet, or any other suitable device. The system preferably functions to provide a location recommendation based on content generated from the social network connections of a user 120.

The system can include, on one or more processors of the device 300 or server 200, a data fetching module 202 that retrieves data from one or more social networks, an influence computation module 204 that computes the influence score for each of a plurality of locations for one or more users of a social network (e.g. primary connections), and a storage module 206 that stores the influence scores. The influence computation module 204 can additionally compute an influence score for each of a plurality of topics, times or any other suitable vector for one or more users of the social network. The influence computation module 204 can pre-compute the influence score at regular intervals for any number of predetermined vectors, or can compute the influence score in real-time (e.g. upon receipt of a user request). The storage module 206 can additionally store a user profile and/or user settings. The system 100 can additionally include a recommendation module 208 that extracts a recommendation from content generated by the one or more users of the social network. The data derived from the influence score (e.g. a recommendation or an influence score) can be delivered by a delivery module to a selected interface, web module, mobile module 302, or data set. The mobile module 302 is preferably a native application on the device, but can alternatively be executed by a browser or on any other suitable mobile medium.

Figure 2:
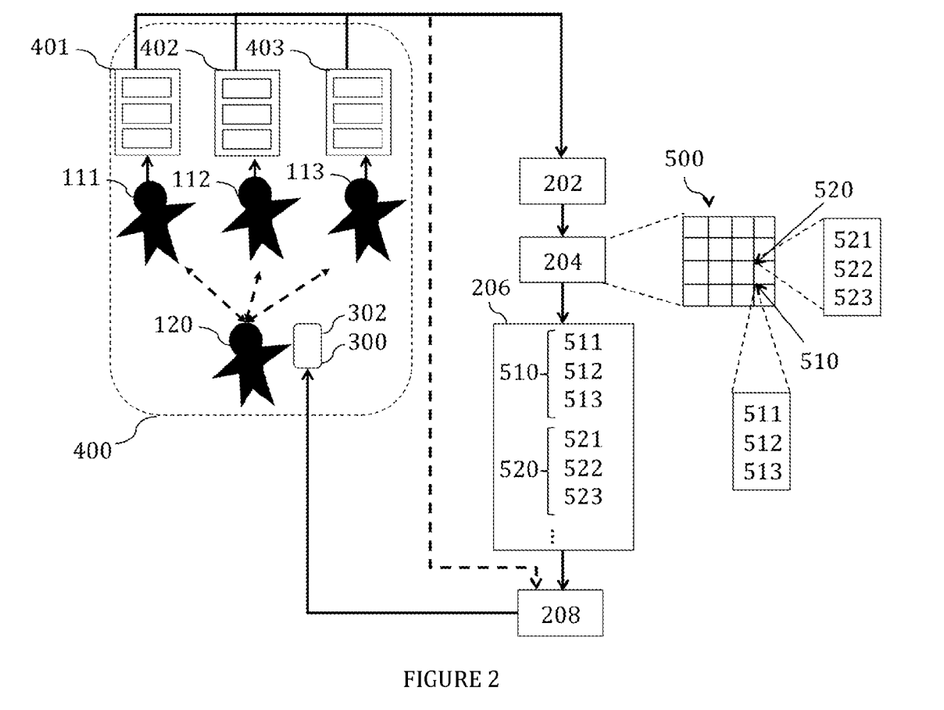
FIG. 2 is a schematic representation of a variation of the system for providing a recommendation.

In one variation, as shown in FIG. 2, the system 100 preferably retrieves connection content (401, 402, 403) associated with the social network connections of a user 120 (primary connections 111, 112, 113) from a social network 400; calculates an influence score for each of a plurality of vectors (e.g. influence scores 511, 512, 513, 521, 522, 523 for each of a plurality of locations 500, such as 510 and 520) for each social network connection (111, 112, 113); and sends data derived from the influence scores to the device 300. The system 100 preferably additionally stores a user file associated with the user of interest. The user file preferably stores a user profile for the user, the influence scores for the primary connections, and any recommendations made to the user. The user file can additionally store influence scores of secondary connections (social network connections of the primary connections), but the influence scores of the secondary connections are preferably stored within the user files for the primary connections. The user profile preferably includes a plurality of user preferences generated from historical user data, such as user-generated content retrieved from the social network, user-associated content generated by other users on the social network, user profiles for the social network, or any other suitable user data. The user preferences are preferably stored as weighted keywords within the user profile, but can be stored in any suitable manner. The user profile can additionally store user settings, such as location thresholds, time thresholds, and primary connection selections. The user file is preferably updated as new content is generated by the user or the primary connection, but can alternatively be updated periodically or in response to any suitable update condition. In another variation, all the aforementioned functions can be performed by the device 300.

2. Method.

Figure 3:
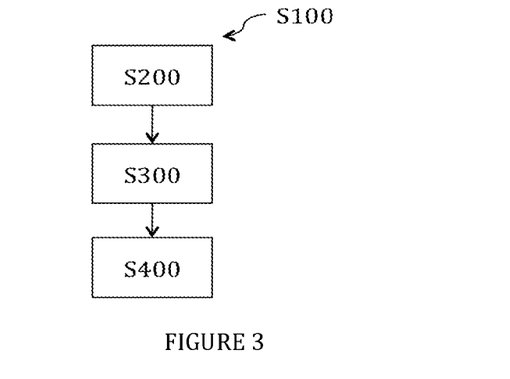
FIG. 3 is a schematic representation of a method for providing a recommendation.

As shown in FIG. 3, the method S100 of the preferred embodiments includes retrieving connection content associated with a social network connection of a user from a social network S200, calculating an influence score for the social network connection for each of a plurality of vectors S300, and presenting data derived from the influence score to the user S400. More preferably, the method retrieves connection content associated with multiple social network connections of the user, calculates an influence score for each social network connection for each of a plurality of locations, and, in response to the receipt of a user request, sends data derived from the influence scores to the mobile module. The method S100 functions to leverage a user's social network to provide location-based recommendations to a user that are proximal a location of interest (e.g. the user location). In doing so, the method determines which of the user's social network connections are the most influential relative to the location of interest, and which of the user's social network connections are the most relevant to the user. The method synthesizes at least these two factors to generate a location-based recommendation. The location-based recommendation is preferably a venue recommendation, but can alternatively be product recommendations, service recommendations, event recommendations, or any other suitable location-based recommendation. A venue is preferably a retail store, public venue, private venue, or any other suitable physical location. The method is preferably performed in real time or near-real time, but connection content retrieval and influence score calculation can alternatively be performed at regular intervals, as new data is received, or at any other suitable frequency.

The social network of the user is preferably determined from an aggregation of the accounts associated with a given user on one or more social network platforms. Each social network platform preferably includes a plurality of accounts, one of which the user is associated with, wherein each account is preferably associated with a content stream. The content stream preferably includes one or more pieces of content generated by the user or a connection of the user. Content can include check-ins, text, videos, images, audio clips, links, positive or negative indicators, re-posts, tags, references, or any other suitable form of content. Each account can additionally be associated with a profile, wherein the profile preferably includes the associated user's information and/or preferences.

The social network connection of the user (primary connection) is preferably another user of a social network platform that the user is connected to. The primary connection is preferably any individual that can read or access the activities of the user. Primary connections can include users connected to the user through various degrees of network links, reciprocal connections, one-way connections, public connections, private connections, or any other suitable type of network link. The primary connection is preferably another user that has an explicit connection with the user (e.g. wherein the relationship is verified by both parties). However, a primary connection can be any user that can read posts generated by the user, any user that can comment on posts generated by the user, any user whose content stream and/or posts can be accessed by the user, or any other suitable user. When multiple social networks are accessed, multiple instances of a single primary connection are preferably consolidated (e.g. by a common identifier, such as an email address), wherein content generated by the primary connection across multiple social networks are aggregated into one set of connection content.

Retrieving connection content associated with a social network connection of a user from a social network S200 functions to collect data generated by one or more of the user's social network connections (primary connections) over one or more social network platforms. Connection content is preferably retrieved from the social network platforms with which the user is associated, but can additionally be retrieved from social network platforms with which the user is not associated but with which the primary connection is associated. Connection content associated with a primary connection is preferably content generated by the primary connection within the social network, but can additionally be content generated by the primary connection outside of the social network, social network content referencing the primary connection, such as content generated by other social network users that refer to, tag, or link to the primary connection, or any other suitable content associated with the primary connection. Retrieving the connection content S200 is preferably performed by a server or a user device before receipt of a user request, but can alternatively be performed in response to the receipt of a user request.

Retrieving the connection content S200 preferably includes accessing a user account associated with the user and collecting data from primary connection accounts associated with the user account. Accessing an account associated with the user preferably includes receiving permissions from the user, more preferably from the user device. Collecting data from primary connections preferably includes accessing a list of primary connections associated with the user account using the received permissions and retrieving content associated with the primary connections. Accessing the list of primary connections can additionally include accessing a list of social network connections (secondary connections) for each of the primary connections, accessing a list of social network connections (tertiary connections) for each of the secondary connections, and/or identifying primary connections connected to the user to any suitable degree of removal. Retrieving content associated with the primary connections preferably includes retrieving all the content associated the primary connection within the social network, but can alternatively include retrieving content associated with the primary connection and generated within a predetermined time period (e.g. within a given time period from the time of content retrieval), retrieving content associated with the primary connection and associated with a request, such as a given location or a keyword, or retrieving any other suitable subset of content associated with the primary connection. Content can be retrieved for all primary connections, or can be retrieved for a subset of primary connections (e.g. family, close friends, highly influential users, etc.). The subset of primary connections for which content is retrieved can be specified by the user as a part of a user request or a user setting.

Retrieving connection content S200 can additionally include processing the connection content to extract vector parameters. The connection content is preferably processed to extract a location and time associated with the content, and can additionally be processed to extract a topic associated with the content, sentiment, content statistics (e.g. number of views, comments, positive and/or negative indicators, etc.) or any other suitable parameter. Extracting the location can include extracting a location from geotags, content text, content images (e.g. the background of an image, identified through image processing), content sounds (e.g. the sound of an espresso machine indicates a coffee shop), content generation location, or from any other suitable portion of the content. The content can be assigned multiple locations, preferably related through a location hierarchy tree (e.g. San Francisco and California) but alternatively unrelated, or can alternatively be assigned a single location. A location from the content body (e.g. geotags, text, images, etc.) preferably overrides the content generation location. Extracting a time can include extracting the content generation time (e.g. from a timestamp); processing the text to determine mentions of time-related events (e.g. breakfast, Pitchfork Festival, an hour ago, etc.), preferably with natural language processing but alternatively with any suitable method; or utilizing any other suitable time analysis method. Extracting a topic can include extracting keywords through natural language processing, keyword matching, or any other suitable method. The content can be assigned multiple topics, preferably related through a topical hierarchy tree, but can alternatively be assigned a single topic or multiple topics that were mentioned within the content. Extracting sentiment can include extracting sentiment from keywords with natural language processing or any suitable method, wherein the post sentiment is preferably positive if keywords or characters associated with positive associations (e.g. "awesome," "!") appear within the post, and the post sentiment is preferably negative if keywords or characters associated with negative associations (e.g. "horrible") appear within the post.

Calculating an influence score for each primary connection for each of a plurality of vectors S300 functions to determine the amount of influence or authority the primary connection has over a given vector for the user. The vectors can be locations, times, topics, or any other suitable vector for which the influence of a primary connection can be determined. Calculating an influence score for each of a plurality of vectors is preferably performed for every primary connection of the user, but can alternatively be performed for a subset of primary connections (e.g. close friends, family, etc.). The influence score for a primary connection is preferably individual to each user. Given two users sharing a primary connection, the influence score for the same primary connection for the same vector can be different for each user.

The content that the influence score is calculated from preferably includes the entirety of content generated by the primary connection, but different categories of content can be given different weightings or excluded from the influence score calculation. Different categories of content can include content generated within a predetermined time period (e.g. within several days or weeks from the time of influence score calculation), content generated within a given area, a specific type of content (e.g. text-based content, image-based content, video-based content, etc.), content generated within a given social network, content associated with user preferences (e.g. content having a preference association score over a predetermined threshold), or any other suitable content categorization. The content used to calculate the influence score can be content filtered from the bulk of retrieved content, or the desired content can be the only content that was retrieved from the social network (e.g. by applying filters or settings during content retrieval).

The influence score is preferably a positional influence score, wherein a positional influence score is calculated for each primary connection for each of a plurality of locations. The positional influence score is preferably indicative of the primary connection's influence or authority on a given location. The locations are preferably geographic locations, and can be defined politically, culturally, or personally. Locations can be latitude and longitude coordinates, rooms, buildings, streets, districts, counties, states, countries, or any other suitable degree of resolution. The influence score can alternatively be, or incorporate, a topical influence score, wherein a topical influence score is calculated for each primary connection for each of a plurality of topics. The positional influence score is preferably indicative of the primary connection's influence or authority on a given topic. The topics can be an object, a collection, a system, or any suitable rank or level of a topical hierarchy. The influence score can alternatively be, or incorporate, a temporal influence score, wherein a temporal influence score is calculated for each primary connection for each of a plurality of times. The temporal influence score is preferably indicative of the primary connection's influence or authority on a given time or time frame. Times can be milliseconds, seconds, minutes, hours, days, months, seasons, years, events (e.g. Christmas), times of the day (e.g. morning, afternoon, evening), events associated with times of the day (e.g. breakfast, brunch, lunch, dinner, dessert), time periods (e.g. WWII), or any other suitable unit or period of time. However, the influence score can be a score indicative of the influence or authority a primary connection has over any suitable vector.

The influence score is preferably calculated based on the volume of connection content associated with the vector that is generated by the primary connection for which the score is being calculated. The influence score for a primary connection having a high volume of vector-associated connection content is preferably higher than that of a primary connection having a lower volume of vector-associated connection content. However, the influence score can be calculated in any suitable manner. A positional influence score for a location is preferably calculated from connection content generated by the primary connection and associated with the location. Content associated with the location can be content generated within the location, content generated within a predetermined distance of the location, content referencing the location, content referencing a business, landmark, or feature within the location, content referencing an event within the location, or any other suitable content associated with the location. A topical influence score for a topic is preferably calculated from connection content generated by the primary connection and associated with the topic. Content associated with the topic can be generated content that includes the topic, generated content that includes a superior, subordinate, or peer of the topic within a topical hierarchy, generated content that includes a related topic (e.g. content including doughnuts when the topic is coffee), or any other suitable content association with the topic. A temporal influence score is preferably calculated from connection content generated by the primary connection and associated with the time. Content associated with the time can be content generated at or within the time, content referencing the time (e.g. content generated at noon but referencing breakfast), or content otherwise associated with the time.

The influence score for the primary connection for a vector can additionally be calculated based on the influence scores of the social connections of the primary connection (secondary connections) for the vector. The influence scores of the secondary connections can, in turn, be influenced by the influence scores of their social network connections. The influence score of a first primary connection having secondary connections with high influence scores for the vector will preferably be higher than a second primary connection having little or no secondary connections with high influence scores regarding the vector. However, the influence scores of the secondary connections can be otherwise used to adjust the influence score of the primary connection for the vector.

The influence score can additionally be calculated or adjusted based on the degree of removal between the primary connection and the user. For example, the influence score for a primary connection that is directly connected to the user is preferably increased more than an influence score for a primary connection that is three degrees removed from the user. However, the influence score can be adjusted in any other suitable manner based on the degree of removal between the primary connection and the user, or be unaffected by the degree of removal.

The influence score can additionally be calculated based on the number of users associated with the vector. The influence score for the primary connection preferably varies inversely with the number of users associated with the vector, but can vary in any suitable manner relative to the number of users associated with the vector. The influence score can be dependent on the absolute value of users associated with the vector, density of users associated with the vector, the rate of change of the number of users associated with the vector, or any other suitable metric derived from the number of users associated with the vector. The number of users considered can additionally be filtered by the intersection of multiple vectors, such as by location and by time (e.g. in New York at breakfast time). The influence score can be adjusted based on the number of users within a given location. Suppose a user has all activity focused within a small geographical boundary, then his influence score will gradually decrease as a function of distance from that location and the population/venue densities between his activity center and specified location. For example, given a first user in New York City and a second user in the deserts of Nevada with the same amount of activity (e.g. content generation), the first user will have a smaller influence score and influence distance compared to the second user. The influence score can also be adjusted based on the number of users generating content associated with a topic. For example, given a first user generating content about coffee and a second generating content about basket weaving with the same amount of activity (e.g. content generation), the first user will have a smaller influence score and influence propagation along the topic hierarchy compared to the second user. The influence score can also be adjusted based on the number of users generating content associated with a time or with any other suitable vector.

The influence score can additionally be calculated based on the engagement level between the user and the primary connection. The engagement level is preferably determined from a history of social network interactions between the user and the primary connection. Social network interactions can include communication, such as direct messages, posting to the account of the other user, gifting, or any other suitable form of communication; responses to actions, such as repeating, responding, providing positive or negative indications, sharing with others, or any other suitable response; interaction with content generated by the other user, such as viewing the content; interaction with recommendations derived from content generated by the other user; or any other suitable social network interaction that can occur between the user and the primary connection. The engagement level is preferably determined from the rate of social network interaction, but can alternatively be the number of interactions, or any other suitable metric of engagement level. Different types of interaction can be weighted differently when calculating the engagement level. For example, tagging a post with a positive indicator (e.g. a "Like") can be weighted less than a comment on the post. The influence score preferably varies with the engagement level, wherein high engagement levels preferably increase the influence score or correlate with a higher influence score, and low engagement levels preferably decrease the influence score or correlate with a lower influence score. The influence score can be directly adjusted by the volume of social network interaction (e.g. added to the influence score, used as a multiplier, etc.). Alternatively, different levels of engagement, as determined by using engagement thresholds, can be used to adjust the influence score (e.g. the influence score has a different engagement multiplier when the interaction rate is higher than a first threshold). When low or no engagement is detected between the user and the primary connection, the influence score can be lowered, unaffected by the engagement level (e.g. the influence score is dependent on the location and topic influence scores), or otherwise adjusted.

The influence score for the primary connection for a vector can additionally be calculated based on the engagement level with the primary connection for the vector. The influence score can be influenced by the general engagement level with the primary connection for the vector, which includes the engagement level between the primary connection and their secondary connections for the vector. For example, when the primary connection produces substantially equivalent amounts of connection content regarding a first vector (e.g. mountain biking) and a second vector (e.g. basket weaving), but the secondary connections engage more with connection content associated with the first vector and less with connection content associated with the second vector, the influence score for the first vector is preferably increased and the influence score for the second vector is preferably unchanged or decreased. The influence score for the vector can also be influenced by the engagement level between the primary connection and the user for the vector, particularly when the primary connection engages with the user for only a select subset of vectors. For example, when a primary connection engages with the user over mountain biking but not French food, the primary connection's influence score for mountain biking can be increased while the influence score for French food is decreased or unaffected.

The influence score can additionally be calculated based on the social network with which the primary connection is associated. When multiple social networks are used, the user can prefer recommendations from users of a first social network over recommendations from users of a second social network, as determined from user responses to recommendations, user engagement levels with primary connections of a social network, user settings, or any other suitable means of determining a user social network preference.

Figure 4:
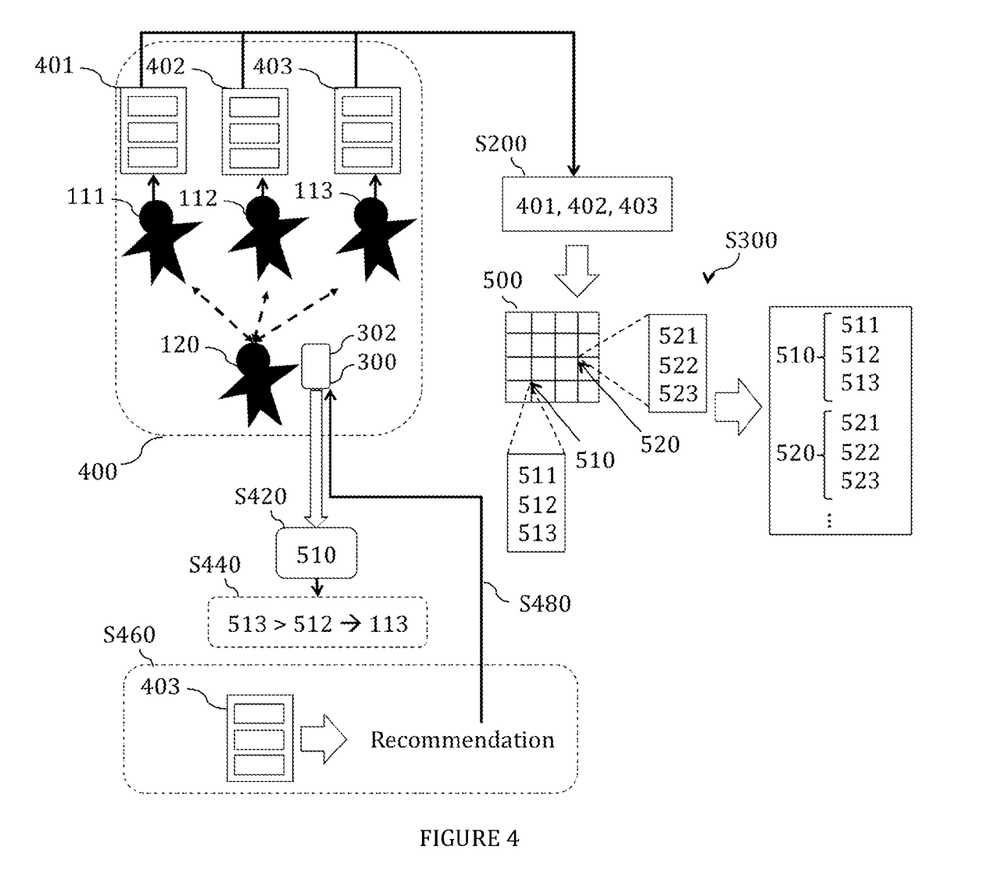
FIG. 4 is a schematic representation of a variation of the method for providing a recommendation.

Presenting data derived from the influence score S400 preferably functions to present a result influenced by the influence score of a primary connection to the user. Presenting data derived from the influence score preferably includes sending data derived from the influence score to a mobile module. More preferably, the result is a venue recommendation that is determined from the influence scores of the primary connections of the user. The sent data is preferably a recommendation derived from connection content, filtered by the influence score, but can alternatively be the influence score itself or any other suitable data that can be derived from the influence score. As shown in FIG. 4, sending data derived from the influence score is preferably performed in response to receiving a request from a device associated with the user S420, but can alternatively be performed in response to any suitable condition. Sending data derived from the influence score preferably includes identifying one or more primary connections having the highest ranked influence scores S440, extracting a recommendation from relevant connection content S460, and sending the recommendation to the device S480. Presenting data derived from the influence score S400 can additionally and/or alternatively include displaying the data on the device, particularly when the recommendation is extracted by the device.

Receiving a request from a device associated with the user S420 functions to indicate that a recommendation should be generated. The request preferably includes a vector request, such as a location, topic, or time request. More preferably, the request includes at least a location request and a time request, and can additionally include a topic request or any other suitable vector. The vector request can be automatically determined by the device, or can be received by the device from a user. For example, the device can send a request to the server upon initiation of a native application, wherein the request includes a location associated with the device and can additionally include a time associated with the time of request generation. In another example, the device can receive a location or a topic request from the user, and send the location or topic request as the request to the server. The request can additionally include an identifier (e.g. login information, phone number, etc.) that functions to uniquely identify the user. The location can be determined from the device GPS, multilateration, WiFi location, accelerometer logs, IP address, or any other suitable device location determination means. Alternatively, the location can be determined from a keyword input, wherein the keyword input can be a text input received by the device or a keyword selection (e.g. from a list). Alternatively, the location can be determined from an image selection (e.g. selection of a location on a map), an audio entry (e.g. voice entry of a location name), or any other suitable location selection. Alternatively, the location can be determined from physical proximity, wherein near-field communication technologies (RF, Bluetooth, etc.) or detection of the user device on a wireless network can be used. The location is preferably determined by a native application, but can alternatively be determined by a device API (e.g. when the messaging platform is a web application for mobile devices). The time is preferably determined from the device clock, but can alternatively be determined from a mobile service provider, received as a keyword input or selection from the user, or determined in any suitable manner. The topic is preferably received from the user as a keyword input or as a keyword selection, but can alternatively be determined by the device or server from a history of user activities (e.g. generated content), or derived from the time of day from a history of multiple users' activities (e.g. any request received between the hours of 7 AM to 11 AM can be associated with "morning"). For example, the system can determine that the user buys coffee in the morning, based on past content generated by the user and associated with "morning" and "coffee." The system can then add "coffee" to a request including a time associated with "morning" (e.g. when the request is sent or received), wherein a recommendation sent to the user will be influenced by venues associated with coffee. In a specific example, in response to native application access in the morning, the device will send the server a request including the device location and the request time. The server will determine that the time is associated with morning, determine that the user typically buys coffee in the morning, and return a recommendation for coffee houses near the device location.

Identifying one or more primary connections having the highest ranked influence scores for the vector S440 functions to determine the most influential primary connections on the topic for the user. More specifically, identifying primary connections with the highest ranked influence scores functions to identify primary connections from which the most relevant recommendations can be extracted. The identified primary connections can be the primary connections having the highest influence score for the vector. The identified primary connections can also be public influencers, wherein the public influencers can be users of the social network that are not directly connected to the user, but have high influence scores for the vector across a large number of users (e.g. over a predetermined user threshold). The vector is preferably a vector from the request, but can alternatively be any suitable vector. The identified primary connections can alternatively or additionally be the primary connections having the highest influence score for subordinates of the vector within a vector hierarchy tree. For example, if the vector includes "San Francisco," primary connections with high influence scores related to San Francisco (e.g. connections with high influence scores within the "San Francisco" and "Castro" categories) are preferably identified. The identified primary connections preferably have high engagement levels with the user, wherein the engagement levels can be used to filter the identified primary connections or can be a portion of the influence score calculation. Alternatively, the identified primary connections can have little or no engagement levels with the user. Identifying one or more primary connections having the highest ranked influence scores preferably includes calculating influence scores for each of the primary connections for the vector and comparing the influence scores to determine that the influence score for a primary connection is higher than the influence scores of the other primary connections of the user. However, any other suitable method of determining the most relevant primary connections can be used. Multiple primary connections are preferably identified, but a single primary connection can alternatively be identified. Which primary connections are identified can be dictated by user settings or user preferences (e.g. user settings dictate that only recommendations from a given subset, such as the top ten relevant primary connections, be used), by one or more influence score thresholds (e.g. any primary connection having an influence score above the influence score threshold will be identified), or by any other suitable means of selecting relevant primary connections.

Extracting a recommendation from the relevant connection content S460 functions to determine one or more recommendations for the user. The relevant connection content is preferably connection content that is both generated by the identified primary connection and associated with the vector. The relevant connection content can be connection content generated by a single identified primary connection, or connection content generated by multiple identified primary connections. The relevant connection content can additionally be filtered by location thresholds (e.g. within a given distance), time thresholds (e.g. generated within a given time period, referencing a given time period, etc.), topic thresholds (e.g. proximity to the specific topic within a hierarchy tree, wherein the specific topic can be a portion of a user request), sentiment, user preferences, or by any other suitable content filter, wherein the filters can be default settings or be set by the user. The recommendation is preferably a venue associated with the relevant connection content, but can alternatively be a product, service, event, or any other suitable recommendation associated with the relevant connection content. Potential recommendations associated with the relevant connection content can be recommendations mentioned within the relevant connection content, tagged within the relevant connection content, having a known location association with the relevant connection content location (e.g. a store located at a given latitude and longitude associated with the content), or be any other suitable recommendation associated with the relevant connection content. The extracted recommendation can be a potential recommendation with the most references within the relevant connection content (e.g. within a single primary connection's content or across multiple primary connections' content), recommendations with a reference rate or number of references above a reference threshold, recommendations with the highest rating (e.g. recommendations with the highest ranking from a separate ranking service, such as Yelp or Zagat), recommendations having the best fit with user preferences, recommendations satisfying the request (e.g. a topic request, location request, etc.), or any suitable recommendation that can be identified from the relevant connection content. While one recommendation can be extracted from the relevant connection content, multiple recommendations are preferably extracted. The multiple recommendation can be ranked, wherein recommendation ranking can be calculated from the number of pieces of content referencing the recommendation, the influence score of primary connection(s) that the recommendation is derived from, the proximity of the recommendation to a request vector (e.g. a location, topic, etc.), the similarity of the recommendation to the user preferences, or calculated in any suitable manner indicative of recommendation relevance to the user. The number of recommendations that are extracted can be set (e.g. a default number or by a user setting), be determined by a threshold, or determined in any suitable manner.

Sending the recommendation to the device S480 functions to transfer the recommendation to the user device. The recommendation is preferably sent by the server and received by the device. The recommendation is preferably received by the device at a native application (e.g. mobile module), but can be received in any suitable manner. The sent data can include name of the recommendation, the location of the recommendation, and/or any other information associated with the recommendation (e.g. reviews, pictures, menu, site links, etc.). The recommendation is preferably sent through a wireless connection, such as through cellular networks, WiFi, radio frequency, Bluetooth, and near-field communication, but can alternatively be sent through wired connections, such as LAN lines.

Displaying the data on the device functions to present the data to the user. The data is preferably a recommendation, but can alternatively or additionally be the influence score (e.g. of the user or of a primary connection) or any other suitable data related to the influence score. The data can be displayed as an ordered list, as an overlay on a map, as a set of direction instructions, or displayed in any other suitable manner. The data is preferably displayed as a recommendation reference, wherein the recommendation reference can be the name of the recommendation, a picture associated with the recommendation (e.g. a picture taken by a primary connection, a picture from a venue website, etc.), a generic icon, or any other suitable visual display. The displayed data preferably includes actionable links associated with the recommendation reference, wherein selection of the recommendation reference can allow the user to perform an action, such as view a review on the recommendation, visit a website associated with the reference, make a reservation for the recommendation, notify the recommendation venue of an imminent visit, get directions to the recommendation, or any other suitable action. The displayed data can additionally include personalized data extracted from the primary connection from which the recommendation is derived, such as the primary connection's favorite dishes, favorite time of the week to visit the recommendation, or any other suitable data that can facilitate a personalized user experience. The displayed data can additionally include an explanation as to why the recommendation was selected, wherein the explanation can include which primary connection was the primary influencer, what the influence scores of the influencing primary connections were, how many primary connections referenced the recommendation, what user setting influenced the recommendation the most, or any other suitable explanation for the recommendation. The displayed explanation can additionally include one or more options for the user to adjust future recommendations, wherein the user selections can be stored within the user profile. The displayed data can be static for a predetermined period of time, or can be dynamically updated (e.g. the displayed influence score can change in real time, such as in response to a user action). However, the data can be displayed in any suitable manner.

The method S100 can additionally include determining a response from a user and adjusting a user file based on the response. By determining a user response and adjusting the user file based on the response, the method can provide recommendations that are more aligned with user preferences.

Determining a response from the user is preferably performed after a recommendation is sent to the mobile module, wherein the response is preferably a response to the recommendation. Determining a response from the user can include determining user engagement with the recommendation, determining user content generation in response to the recommendation, tracking user movements through the device, determining user propagation of the recommendation, determining repeat user action relative to the recommendation, or any other suitable method of determining a user response. Determining user engagement with the recommendation can include tracking or measuring the time duration the user spends looking at the recommendation (e.g. the amount of time the specific recommendation is open on the user device), the time duration the user spends looking at recommendation-associated connection content, the number of click-throughs on links associated with the recommendation (e.g. menu, reservation options, etc.), or tracking any other suitable parameter indicative of user interest in the recommendation. Determining user content generation in response to the recommendation can include receiving a notification from the social network of user content generation, retrieving the generated content, and determining that the content references the recommendation or is geotagged with a location associated with the recommendation. However, other methods of determining user content generation can be used. Tracking user movements through the device can include periodically sending, by the device, the device location to the server, but can include other methods of user movement tracking. Determining user propagation of the recommendation preferably detects user recommendation of the recommendation to other users, and can include identifying content generated by primary connections that reference both the user and the recommendation (e.g. "Thanks @johnny for telling me about Blue Bottle," wherein Johnny is the user and Blue Bottle is the recommendation). However, other methods of determining user propagation can be used. Determining repeat user action relative to the recommendation can include determining multiple pieces of user-generated content associated with the recommendation, but can alternatively include multiple subsequent visits by the user (as determined by device tracking, user calls made from the location, etc.) or any other suitable method of determining repeat user action.

Determining a response from the user can additionally include teaching the user how to improve their influence score. This can include displaying the influence score for a vector, such as a topic or location, to the user. Displaying the user's influence score can be in response to a user selection (e.g. selection of a "show my influence"), or can be in response to a determination that the user satisfies a notification condition (e.g. from historical data, such as determining that the user visits a venue over a repeat threshold without generating a given type of content). Teaching the user how to improve their influence score is preferably explicit, such as suggesting that the user generate more of a specific content type associated with the vector (e.g. suggest that the user take more photos associated with the vector, wherein photos contribute more to the influence score than a post does), or can be implicit (e.g. display photos associated with the vector alongside the influence scores of the connections that generated said photos). The system preferably substantially instantaneously recalculates the user influence score for the vector once a suggestion is acted upon. The system preferably additionally records which type of suggestion the user is most receptive to, stores the suggestion type in the user profile, and tailors future suggestions based on the stored suggestion type.

The system can be receptive to a user response for a predetermined amount of time after the recommendation is sent or after a recommendation is selected by the user. Alternatively, the system can constantly be receptive to any user action indicative of a user response. The amount of time that the system is receptive to the user response is preferably dependent on the type of user response to be determined. For example, user movements are preferably tracked for a predetermined period of time after recommendation sending, but user generated content associated with the recommendation can be tracked indefinitely.

Adjusting a user file based on the response functions to adjust stored user preferences to better match the actual preferences of the user. Adjusting the user file preferably includes analyzing the response for a positive or negative response, and adjusting the user file accordingly. A positive response can be the user visiting the recommendation, generating positive content about the recommendation (e.g. as determined by natural language processing), propagating the recommendation, or any other suitable positive response to the recommendation. A negative response can be the user not visiting the recommendation, visiting a non-recommended venue, generating negative content about the recommendation (e.g. as determined by natural language processing), diverting other users away from the recommendation, manually removing the recommendation from the displayed list, or any other suitable negative response to the recommendation. The influence score for the primary connection from which the recommendation was derived can be increased for vectors associated with the recommendation source (e.g. vectors associated with the connection content from which the recommendation was extracted) in response to a positive user response, and decreased in response to a negative user response. Alternatively, the influence score for the primary connection from which the recommendation was derived can be increased if the user action correlates with the sentiment expressed in the recommendation source. For example, if the recommendation source (connection content from which the recommendation was derived) expresses a negative sentiment about a recommendation and the user response is a negative response (e.g. not going to the recommendation), then the influence score for the vectors associated with the recommendation can be increased for the primary connection that generated the recommendation source. Influence scores for vectors hierarchically associated with the recommendation vector can additionally be adjusted. Influence scores for primary connections associated with the source primary connection can also be adjusted. Alternatively and/or additionally, weighting for keywords associated with the recommendation can be increased. In response to a negative user response, the influence score for the primary connection from which the recommendation was derived can be decreased for vectors associated with the recommendation source. Alternatively and/or additionally, weighting for keywords associated with the recommendation can be decreased. However, the user file can be adjusted in any suitable manner in response to a positive or negative user response.

The method can additionally include generating a user profile, which functions to determine user preferences. Generating a user profile is preferably performed prior to or concurrently with retrieving connection content, but can alternatively be performed at any time. Generating a user profile preferably includes retrieving user-associated content (user-generated or content referencing the user) from the one or more social networks, extracting keywords indicative of user preferences from the content (e.g. keywords or topics mentioned at a rate over a predetermined threshold, explicit preference or authority assignments such as "I love coffee" or "Labesh is the expert at Indian food," etc.), and storing the keywords within a user profile. Generating a user profile can additionally include weighting the keywords, wherein the keyword weight preferably varies with an indicator of user preference (e.g. more instances of the keyword confer a higher weight).

As a person skilled in the art will recognize from the previous detailed description and from the figures and claims, modifications and changes can be made to the preferred embodiments of the invention without departing from the scope of this invention defined in the following claims.

We claim:

1. A method for determining and utilizing a user influence score, comprising:
   retrieving user activities from a social network, the user activities comprising activities, associated with the social network, by the user;
   retrieving connection activities from the social network, the connection activities comprising activities, associated with the social network, by primary connections, the primary connections comprising social network connections of the user;
   calculating, for the user, a user influence score for each of a plurality of locations based on:
     the volume of user actions proximal the location;
     an influence score of each primary connection for the location, based on the volume of connection activities of the social network connection proximal a geographic location;
     an engagement level between the primary connection and the user, based on a history of social network interactions between the user and the primary connection; and
   calculating a topical influence score for a topic based on:
     the volume of user actions related to the topic;
     the general engagement level with the user for the topic;
     an influence score of each primary connection for the topic, based on the volume of connection activities generated by the primary connection and associated with the topic; and
     the engagement level between the primary connection and the user;
   sending data derived from the user influence score for a location to a mobile module.

2. The method of claim 1, wherein calculating the influence score comprises increasing the user influence score with decreasing distance between a user activity of the user activities and the location.

3. The method of claim 1, wherein calculating the influence score comprises increasing the user influence score with decreasing time duration between a time associated with the user activity of the user activities and a time of calculation.

4. The method of claim 1, wherein calculating the influence score further comprises adjusting the user influence score by a location density for each of the plurality of locations.

5. The method of claim 4, wherein adjusting the user influence score comprises adjusting the user influence score for the location inversely with the location density for the location.

6. The method of claim 1, wherein calculating the user influence score for each of a plurality of locations is further based on an influence score of secondary connections on the location, the secondary connections comprising the social network connections of the a primary connection of the primary connections.

7. The method of claim 1, wherein sending data derived from the user influence score to a mobile module is performed in response to receiving a location request from a second user, the second user being a social network connection of the user, wherein sending data derived from the user influence score to a mobile module comprises:
   determining that the user influence score is higher than influence scores of other social network connections of the second user;
   extracting a recommendation from the user actions associated with the location request;
   sending the recommendation to a mobile module associated with the second user;
   determining a response from the second user; and
   adjusting the user influence score based on the response.

8. The method of claim 7, wherein the user influence score is increased when the response from the second user is a positive response, and decreased when the response is a negative response.

9. A method for providing a location-based recommendation for a user, the method comprising:
   retrieving, from a social network, connection content associated with primary connections, the primary connections comprising social network connections of the user;
   calculating, for each of the primary connections, an influence score for each of a plurality of locations based on:
      the volume of connection content associated with the primary connection and associated with the location, and
      an engagement level between the primary connection and the user, the engagement level based on a history of social network interaction between the primary connection and the user;
   receiving a location request from a user device associated with the user;
   extracting a recommendation from relevant connection content, the relevant connection content being content associated with the location request and generated by at least one of the primary connections having the highest influence scores for the location request, the recommendation comprising a venue referenced within the relevant connection content; and
   sending the recommendation to the user device.

10. The method of claim 9, further comprising retrieving, from the social network, secondary connection content generated by secondary connections, the secondary connections comprising social network connections of the primary connections; wherein calculating the influence score for each of the primary connections for each of a plurality of locations is further based on:
   an influence score of each of the secondary connections of the primary connection for the location, based on the volume of secondary connection content generated by the secondary connection and associated with the location; and
   an engagement level between the secondary connection and the primary connection, based on a history of social network interaction between the secondary connection and the primary connection.

11. The method of claim 10, wherein calculating the influence score further comprises calculating a topical influence score for each of a plurality of topics for each of the plurality of primary connections based on:
   the volume of connection content generated by the primary connection and associated with the topic;
   a topical influence score of each of the secondary connections of the primary connection for the topic, based on a volume of secondary connection content generated by the secondary connection and associated with the topic, and
   the engagement level between the secondary connection and the primary connection.

12. The method of claim 9, wherein calculating the influence score further comprises calculating a topical influence score for each of a plurality of topics for each of the plurality of primary connections, the topical influence score calculated based on the volume of connection content generated by the primary connection and associated with the topic.

13. The method of claim 12, further comprising receiving a topic request from the user device; wherein extracting the recommendation from the relevant connection content further comprises extracting the recommendation from relevant connection content generated by at least one of the primary connections having the highest topical influence scores for the topic request.

14. The method of claim 9, wherein extracting a recommendation from relevant connection content comprises identifying a repeatedly referenced venue associated with the relevant connection content.

15. The method of claim 14, wherein extracting a recommendation from relevant connection content further comprises extracting a recommendation from relevant connection content that is generated within a predetermined period of time.

16. The method of claim 14, wherein extracting a recommendation from relevant connection content further comprises extracting the recommendation from relevant connection content that is generated by multiple primary connections with the highest influence scores.

17. The method of claim 9, further comprising:
   storing the influence scores for each primary connection for each location in a user file;
   retrieving, from the social network, content generated by the user;
   generating a user profile, comprising:
      extracting a plurality of keywords, indicative of user preferences, from the content; and
      storing the keywords within the user file;
   wherein extracting a recommendation from the relevant connection content further comprises filtering the relevant connection content with keywords from the user profile.

18. The method of claim 17, wherein generating a user profile further comprises identifying a distance limit, wherein extracting a recommendation from the relevant connection content further comprises filtering the venues extracted from the relevant connection content with the distance limit.

19. The method of claim 17, further comprising determining a user response to the recommendation; and adjusting the user file based on the user response.

20. The method of claim 19, wherein determining the user response comprises detecting generation of content referencing the recommendation; wherein adjusting the user file comprises increasing the influence score of the primary connection from which the recommendation was derived.

21. The method of claim 20, wherein increasing the influence score of the primary connection comprises increasing the influence score of the primary connection for the request location and increasing the influence score of the primary connection for locations associated with the request location.

22. The method of claim 19, wherein adjusting the user file comprises adjusting a weighting of a keyword associated with the recommendation within the user profile.

23. The method of claim 19, wherein determining the user response comprises detecting generation of content referencing a venue different from the recommendation, the content being generated within a predetermined time duration from a time of request location receipt; wherein adjusting the user file comprises decreasing the influence score of the primary connection from which the recommendation was derived.

* * * * *